United States Patent [19]

Matros et al.

[11] Patent Number: 5,658,541

[45] Date of Patent: Aug. 19, 1997

[54] PROCESS FOR REMOVAL OF DIVALENT SULFUR COMPOUNDS FROM WASTE GASES

[75] Inventors: Yurii S. Matros, St. Louis; Steven F. Meyer, Flor., both of Mo.

[73] Assignee: Monsato Company, St. Louis, Mo.

[21] Appl. No.: 405,498

[22] Filed: Mar. 16, 1995

[51] Int. Cl.$^6$ ............................. B01D 53/48; B01J 38/00
[52] U.S. Cl. ............... 423/210; 423/224; 423/230; 423/242.1; 423/244.09; 423/245.1; 423/542
[58] Field of Search ................... 423/210, 220, 423/224, 230, 242.1, 245.1, 541.1, 542, 244.09

[56] References Cited

U.S. PATENT DOCUMENTS

| | | | |
|---|---|---|---|
| 3,429,656 | 2/1969 | Taylor et al. | 23/2 |
| 3,443,886 | 5/1969 | Taylor et al. | 23/2 |
| 3,657,892 | 4/1972 | Perga et al. | 60/274 |
| 3,803,805 | 4/1974 | Low | 55/73 |
| 3,870,474 | 3/1975 | Houston | 23/277 C |
| 4,033,898 | 7/1977 | Jacobson et al. | 252/416 |
| 4,041,128 | 8/1977 | Bramer et al. | 432/213.2 |
| 4,482,637 | 11/1984 | Buss et al. | 502/37 |
| 4,610,972 | 9/1986 | Hughes | 502/52 |
| 4,877,592 | 10/1989 | Matros et al. | 423/245.1 |
| 4,937,058 | 6/1990 | Dupin et al. | 423/224 |
| 5,061,464 | 10/1991 | Cordonna et al. | 423/213.5 |
| 5,145,363 | 9/1992 | Nielson et al. | 432/180 |
| 5,145,825 | 9/1992 | Deeba et al. | 502/242 |
| 5,262,131 | 11/1993 | Bayer et al. | 422/175 |
| 5,356,604 | 10/1994 | von Wedel, et al. | 423/245.2 |
| 5,364,259 | 11/1994 | Matros et al. | 431/5 |
| 5,366,708 | 11/1994 | Matros et al. | 423/210 |
| 5,453,259 | 9/1995 | D'Souza | 423/245.1 |
| 5,458,861 | 10/1995 | Buchanan et al. | 423/244.1 |

FOREIGN PATENT DOCUMENTS

| | | | |
|---|---|---|---|
| 5581730 | 6/1980 | Japan | 423/224 |
| 1583350 | 8/1990 | U.S.S.R. | C01B 17/54 |
| 9014560 | 11/1990 | WIPO | 423/245.1 |

OTHER PUBLICATIONS

"Gas Purification" by Kohl et al., 4th. edition, Gulf Publishing Co., 1985 Houston, TX, USA pp. 400–401 (No month).

"Gas Purification" By Kohl et al., 4th ed., Gulf Publishing, 1985 pp. 306–311 (No month).

T.V. Mulina, et al., "Co Oxidation Over CuCr/Al$_2$O$_3$ Catalysts in Presence of So$_2$", React. Kinet. Catal. Lett., 1988, vol. 37, No. 1, pp. 95–100.

*Primary Examiner*—Gary P. Straub
*Assistant Examiner*—Timothy C. Vanoy
*Attorney, Agent, or Firm*—Senniger, Powers, Leavitt & Roedel

[57] ABSTRACT

A process and apparatus for removal of volatile divalent sulfur compounds from waste gases. Volatile organic compounds are advantageously removed in the same process. The divalent sulfur compounds are oxidized in a combustion zone, then preferably removed from the combustion gas, as by absorption or adsorption. The divalent sulfur compound and any VOCs are oxidized in either a catalytic or thermal combustion zone, after which the combustion gases are cooled by transfer of heat to the contaminated gases entering the combustion zone. A regenerative heat transfer reaction system is preferably used. Catalyst may comprise a noble metal, or oxides of Cr, Cu and/or Mn. A catalyst degraded by deposition of sulfate or sulfite salts on its surface may be reactivated by in situ decomposition of such salts. Reactivation also removes such salts from the heat transfer storage beds of a regenerative heat transfer reaction system.

41 Claims, 7 Drawing Sheets

TEMPERATURE AND CONVERSION PROFILES AT INITIAL ACTIVITY OF CATALYST (SOLID, DOTTED AND DASHED LINES CORRESPOND TO BEGINNING, MIDDLE AND END OF A PERIOD BETWEEN FLOW REVERSAL).

FIG. 5

TEMPERATURE AND CONVERSION PROFILES AFTER 50% DECREASE IN CATALYST ACTIVITY.
(SOLID, DOTTED AND DASHED LINES CORRESPOND TO BEGINNING, MIDDLE AND END OF A PERIOD BETWEEN FLOW REVERSAL).

FIG. 6

TEMPERATURE AND CONVERSION PROFILES AFTER 75% DECREASE IN CATALYST ACTIVITY.
(SOLID, DOTTED AND DASHED LINES CORRESPOND TO BEGINNING, MIDDLE AND END OF A PERIOD BETWEEN FLOW REVERSAL).

FIG. 7

TEMPERATURE PROFILES DURING CATALYST REGENERATION (LINES 1-5 CORRESPOND TO DIFFERENT MOMENTS OF TIME AFTER THE BEGINNING OF CATALYST REGENERATION. 1: 0 MIN; 2: AFTER 10 MINUTES; 3: AFTER 30 MINUTES; 4: AFTER 60 MINUTES; 5: AFTER 2 HRS)

FIG. 8

PROCESS FOR REMOVAL OF DIVALENT SULFUR COMPOUNDS FROM WASTE GASES

BACKGROUND OF THE INVENTION

This invention relates to controlling emissions of volatile sulfur compounds, and more particularly to an improved method and apparatus for removal of a volatile divalent sulfur compounds from a contaminated gas stream. The novel method and apparatus are particularly suited for removal of both volatile divalent sulfur compounds and volatile organic carbon compounds from gas streams.

Thermal and catalytic oxidation processes have commonly been used for removal of volatile organic compounds from effluent gas streams. For example, Matros U.S. Pat. Nos. 4,877,592 and 5,364,259 describe processes in which the volatile organic compounds are burned with oxygen contained in the gas stream. The heat of combustion is recovered by regenerative heat transfer and used to preheat the gas stream to combustion temperature. Thus, the method of the Matros patent is effective for preventing air pollution due to emissions of hydrocarbon gases and vapors. However, the Matros patent does not disclose any method for removing volatile divalent sulfur compounds from an effluent gas stream, or for treating a gas stream that contains both volatile organic compounds and volatile divalent sulfur compounds.

Various industrial processes generate gaseous effluent streams that contain volatile divalent sulfur compounds. For example, the Claus process is effective for economic recovery of sulfur from hydrogen sulfide and mercaptans, but nonetheless typically generates a waste stream containing substantial residual quantities of $H_2S$, $COS$, $CS_2$, $SO_2$ and mercaptans. Internal combustion engine and power generation exhaust gases also typically contain hydrocarbons and sulfur compounds in various state of oxidation. Certain chemical manufacturing processes also produce effluent gases that contain volatile divalent sulfur compounds, including volatile organic sulfur compounds, sometimes in admixture with volatile hydrocarbons.

Processes are known for elimination of the divalent sulfur compounds by catalytic oxidation. Thus, Dupin U.S. Pat. No. 4,937,058 discloses a catalyst for oxidizing sulfur-containing effluent gases from the Claus process. The catalyst is described as comprising metals selected from among Cu, Ag, Zn, Cd, Y, lanthanides, Cr, Mo, W, Mn, Fe, Co, Rh, Ir, Ni, Pd, Pt, Sn, and Bi on a support comprising $TiO_2$, $ZrO_2$, $SiO_2$ —MgO, $SiO_2$ —$ZrO_2$, $ZrO_2$ —$TiO_2$ or their mixtures on a zeolite, with the proviso that the catalyst not contain spinel-type mixed oxides.

Soviet Patent 1,583,358 describes a process for deep oxidation of divalent sulfur compounds over a catalyst comprising 15–20% $CuCr_2O_4$, 5–7% CuO and 10–12% $Cr_2O_3$ on and $Al_2O_3$ support.

Mulina et al., "CO Oxidation Over $CuCr/Al_2O_3$ Catalysts in Presence of $SO_2$," *React. Kinet. Catal. Lett.*, Vol. 37, No. 1, 96–100 (1988) describes the catalytic oxidation of CO in a laboratory flow reactor charged with a catalyst containing $Cr_3O_3$ and CuO in rations ranging from 0.75 to 1.91. Vanadium pentoxide was used as a promoter. The gas mixture entering the reaction zone contained 1 wt.% CO, 8 wt.% $O_2$. The reference describes two types of oxide catalyst deactivation by $SO_2$: (1) fast, mainly at low temperatures due to the formation of surface sulfur compounds; and (2) slow, taking place at higher temperature over a prolonged period of time owing to formation of a sulfate phase. Some catalysts were regenerated by flowing air at 600° C. and then tested in CO oxidation. Mulina et al. report that surface compounds are desorbed at 500°–600° C., whereas their decomposition takes place at temperatures significantly higher than 600° C.

Kovalenko et al., "Dynamics of the Activity of Deep Oxidation Catalysts Under the Extreme, Conditions," (unpublished manuscript received January 1995) discusses the decrease in activity observed in deep oxidation of methane in flowing installations at initial $CH_4$ and $SO_2$ concentrations of 1.0% by volume and 0.5% by volume, respectively. An activity decrease caused by catalyst sample sulfation was observed. The inhibiting effect at 500° C. was found to be stronger for alumino-manganese catalyst than for copper-chromium catalyst. The manuscript states "regeneration conditions of the manganese catalyst after sulfur poisoning with the complete activity reduction have been determined."

Cordonna et al. U.S. patent describes a sulfur tolerant Pt catalyst for the oxidation of volatile divalent sulfur compounds in flue gases from engines combusting fossil fuels.

Deeba et al. U.S. Pat. No. 5,145,825 describes a sulfur resistant catalyst for the oxidation of CO, hydrocarbons and $SO_x$. The catalysts comprise Pt on a titania or zirconia support. The active catalyst phase can be included in a washcoat for a honeycomb carrier. The catalyst is particularly adapted for treatment of automobile exhaust gases, as well as exhaust gases from co-generation plants.

In the processes of Dupin, Cordonna, Mulina, Kovalenko, and Deeba, the reaction gas produced upon catalytic oxidation of sulfur compounds, hydrocarbons, CO, etc. is vented to the atmosphere and the combustion heat of the catalytic oxidation is apparently not recovered.

The Hydrocarbon Processing Process Gas Handbook 1990 describes a fluid bed system for oxidation of $H_2S$, organic sulfur compounds and chloro-organics in a combustion chamber directly fired with a fossil fuel. The contaminated gas stream is preheated by recuperative heat exchange with heat transferred from the combustion gas stream, and the latter stream is exhausted to the atmosphere.

Bayer et al. U.S. Pat. No. 5,262,131 describes a process in which volatile organic compounds are removed from an effluent stream by catalytic combustion, the contaminated gas stream entering the catalytic oxidation zone being preheated by recuperative heat exchange with the combustion gas exiting the oxidation zone.

In operation of the processes described above, sulfur oxides produced contained in the exhaust gases are released to the atmosphere. Processes are known for scrubbing of sulfur oxides from flue gases of power generation plants. Bramer U.S. Pat. No. 4,041,128 describes a system for removing $SO_2$ from an internal combustion engine exhaust gas by passing it through a chamber located upstream of a catalytic converter. The chamber contains two compartments in series, the first compartment containing granular or powdered ferrous sulfide and a second compartment containing granular or powdered ferrous oxide. U.S. Pat. Nos. 3,443,886 and 3,429,656 disclose the use of calcium, sodium and silicon oxides as adsorbents for $SO_x$, while U.S. Pat. No. 3,657,892 discloses the use of active carbon as an $SO_x$ adsorbent. However, there has been a continuing need for methods which remove volatile divalent sulfur compounds from effluent gases without creating excessive $SO_x$ emissions.

SUMMARY OF THE INVENTION

Among the several objects of the present invention may be noted the provision of a process for the removal of volatile divalent sulfur compounds from effluent gases; the provision of such a process which removes such divalent sulfur compounds without generation of excessive $SO_x$ emissions; the provision of such a process which is effective for removal of volatile hydrocarbons contained in the gas stream; the provision of such a process which recovers the heat of combustion of the volatile divalent sulfur compounds and any hydrocarbons contained in the gas stream; the provision of such a process in which the divalent sulfur compounds may be catalytically oxidized; and the provision of such a catalytic process in which the activity of the catalyst may be maintained over an extended period of commercial operation.

A further object of the invention is the provision of apparatus suitable for carrying out such processes.

Briefly, therefore, the present invention is directed to a process for removing a volatile sulfur compound and a volatile organic compound from a contaminated gas stream. The gas stream contains between about 100 and about 1000 ppm by volume of said volatile organic compound. The volatile sulfur compound contained in the gas stream is selected from among hydrogen sulfide, carbon disulfide, carbonyl sulfide, organic sulfur compounds and mixtures thereof. The contaminated gas stream is introduced into a combustion zone and the volatile divalent sulfur compound and the volatile organic compound are oxidized by reaction with oxygen in the combustion zone, thereby producing a combustion gas stream containing sulfur dioxide, carbon dioxide and water vapor. Sulfur dioxide is separated from the combustion gas stream.

The invention is further directed to a process for removing a volatile sulfur compound from a contaminated gas stream in which a volatile sulfur compound contained in the gas stream is reacted with oxygen in or upstream of a bed comprising a solid state material. The reaction produces a combustion gas containing sulfur dioxide. The sulfur compound is selected from among hydrogen sulfide, carbon disulfide, carbonyl sulfide, organic sulfur compounds and mixtures thereof. Surfaces of the bed become progressively coated with sulfite and/or sulfate salts by deposit thereof from the gas stream. The sulfate and/or sulfite salts are removed from the bed in situ while continuing to introduce the contaminated gas stream into the combustion zone and oxidizing the volatile divalent sulfur compound in the combustion zone to produce the combustion gas. The sulfite and or sulfate salts are removed from the catalyst bed by heating the catalyst bed to a reactivation temperature at which the salts are decomposed to sulfur oxide gases, the sulfur oxide gases being purged from the combustion zone.

The invention is further directed to a process for removing a volatile divalent sulfur compound from contaminated gas stream in which a volatile divalent sulfur compound is reacted with oxygen in a combustion zone of a regenerative heat transfer reaction system to produce a combustion gas containing sulfur dioxide. The heat of combustion is recovered and used to preheat the contaminated gas stream entering the combustion zone. The system comprises the combustion zone and at least two regenerative heat exchange zones. In one of the regenerative heat exchange zones the combustion gas exiting the combustion zone is passed over heat storage material which absorbs heat transferred from the combustion gas, and in the other of the heat exchange zones the contaminated gas stream is passed over heat storage material from which stored heat is transferred to the contaminated gas stream before the gas enters the combustion zone. The flow of gas is periodically reversed through a continuing series of cycles so that heat that has been absorbed from the combustion gas is used to preheat the contaminated gas entering the combustion zone.

The invention is still further directed to apparatus for removal of the divalent sulfur compound from a contaminated gas stream. The apparatus comprises a source of a gas containing a volatile sulfur compound and a volatile organic compound. The sulfur compound is selected from among hydrogen sulfide, carbon disulfide, carbonyl sulfide, organic sulfur compounds and mixtures thereof. The apparatus further comprises a combustion zone in which the sulfur compound and the organic compound may be reacted in the gas phase with oxygen to produce sulfur dioxide, carbon dioxide and water vapor. The combustion zone has an inlet for the contaminated gas stream and a exit for combustion gas produced upon reaction of the sulfur compound with oxygen. The apparatus further comprises means for preheating the contaminated gas prior to entry into the combustion zone and means for separating the sulfur dioxide from the combustion gas.

Other objects and features shall be in part apparent and in part pointed out hereinafter.

BRIEF DESCRIPTION OF THE DRAWINGS

Corresponding reference characters indicate corresponding parts throughout the drawings.

DESCRIPTION OF THE PREFERRED EMBODIMENTS

In accordance with the present invention, a system has been provided for substantially complete removal of sulfur from an effluent gas stream containing volatile divalent sulfur compounds. The contaminated gas stream is introduced into a combustion zone where the volatile divalent sulfur compounds are oxidized to sulfur oxides, primarily $SO_2$. Sulfur oxides are removed from the combustion gas, preferably by contacting the combustion gas with a scrubbing medium effective for absorption of sulfur dioxide from the gas stream. The heat of the combustion reaction is recovered, most preferably by regenerative heat exchange, and used to preheat the gas entering the combustion zone. Thus, apparatus for carrying out the process of the invention comprises a combustion zone, a regenerative heat transfer zone or other means for preheating the gas entering the absorption zone, a another regenerative heat transfer zone or other means for cooling the gas exiting the combustion zone, and an absorber or other gas treatment zone for removal of $SO_2$ from the combustion gas.

Preferably, the combustion zone contains a catalyst for the oxidation reaction, though thermal oxidation is also contemplated by the process of the invention. The catalyst can contain a noble metal, such as a platinum group metal. Advantageously, it has been discovered that catalysts which contain no noble metal component are effective for the oxidation reaction. Although sulfur compounds are notorious catalyst poisons, it has been found that certain catalysts, most preferably chromium oxide, copper oxide, and manganese oxides, retain activity over extended of periods of operation in which they serve to catalyze the oxidation of both divalent sulfur compounds as well as hydrocarbons that are typically present in the contaminated gases that contain divalent sulfur compounds. Platinum group metal catalysts also resist rapid poisoning in this service, but are generally less preferred because of their greater cost.

Although resistant to irreversible poisoning, the catalyst used in the process of the invention tends to lose activity as a result of the deposition of sulfite and sulfate salts on the surface of the catalyst during extended operations. However, in an especially preferred embodiment of the process of the invention, the catalyst is reactivated by causing the temperature throughout the catalyst bed to rise to a level at which the sulfite and sulfate salts decompose to form sulfur oxides which are carried off in the gas stream and removed in the absorber. Where regenerative heat recovery systems are used, sulfite and sulfate salts may also deposit on the surfaces of heat storage material, interfering with heat recovery and resulting in increased gas pressure drop through a bed of heat storage material. The same heating procedure that is effective for reactivation of catalyst may be used to remove the sulfite and sulfate deposits from a bed of heat storage material.

Figure 1:
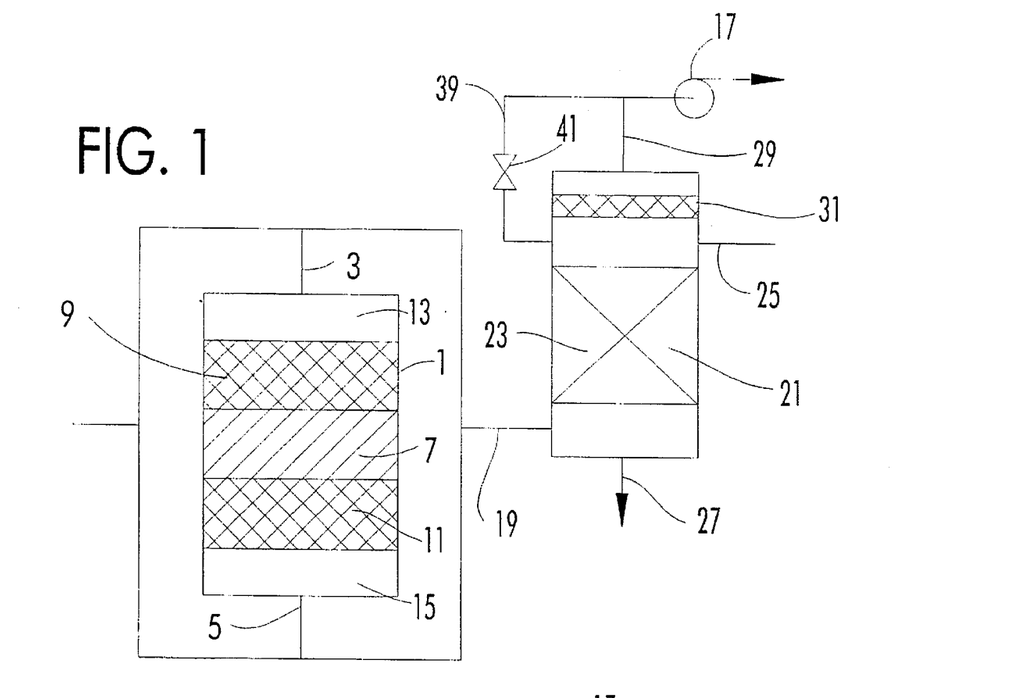
FIG. 1 is a schematic illustration of a preferred process and apparatus of the invention, showing catalytic oxidation of volatile divalent sulfur compounds contained in a contaminated gas stream and preheating of the contaminated gas stream by regenerative heat recovery.

FIG. 1 illustrates a regenerative heat transfer combustion system for oxidizing volatile divalent sulfur compounds in an oxygen containing gas stream. A vertical reactor vessel 1 has a top gas flow connection 3 and a bottom gas flow connection 5 for alternating inlet of contaminated gas and exit of combustion gas. Within vessel 1 is a combustion zone 7 which preferably comprises a fixed catalyst bed comprising a noble metal or metal oxide catalyst. For oxidation of divalent organic sulfur compounds, the catalyst preferably comprises a mixture of chromium oxide and copper oxide, most preferably, between about 3% and about 10% by weight $Cr_2O_3$ and about 3% and about 10% CuO on an alumina support. Alternatively, the catalyst may comprises between about 5% and about 30% by weight MnO catalyst on a similar support. The process may also be conducted with a catalyst comprising a platinum group metal, most preferably platinum, in a proportion of between about 0.1% and about 1.0% by weight on a alumina support. The support for the active phase may be either granular, tabletted, or monolithic, in the form of a honeycomb. If a granular or tabletted catalyst is used, it preferably has an average particle size (principal dimension) of between about 4 mm and about 40 mm.

Alternatively, the volatile sulfur compound may be oxidized in a thermal combustion zone containing no catalyst. In the latter instance, a supplemental heat source is provided to initially bring the mixture entering the combustion zone to combustion temperature. For this purpose, the combustion zone itself preferably contains a supplemental heat source such as a burner (not shown) at which a fossil fuel, such as natural gas, may be burned to bring the zone to a temperature sufficient for the combustion of the divalent sulfur compound. Such a burner may also be used in a catalytic reaction system to initiate reaction. In a further alternative, the combustion zone may contain an electric heater. While preferred, it is not essential that the supplemental heat source contact the gas stream within the combustion zone. According to a further alternative, the gas may be brought to combustion temperature by introduction of heat via a burner, electric preheater or other source located upstream of the combustion zone, e.g., in a regenerative heat exchanger zone of a regenerative heat transfer reaction system.

Depending upon the concentration of divalent sulfur compounds and any hydrocarbons in the gas stream, either a catalytic or a thermal reaction zone may operate autothermally once the reaction is initiated. However, if the concentration of combustibles in the contaminated gas stream is not sufficient for autothermal operation under all conditions, supplemental heat, preferably a fossil fuel, may be introduced into the combustion zone to maintain a temperature and gas composition sufficient for combustion. The fuel may be provided either through a burner within the zone or through a supply introduced into the gas stream upstream of the combustion zone.

Above and in gas flow communication with combustion zone 7 within vessel 1 is a regenerative heat exchange zone 9 comprising a bed of inert heat absorption and storage material such as ceramic, stoneware, rocks, or pebbles which may be of any suitable shape such as saddles, spheres, cylinders, or Raschig rings. Below and in gas flow communication with combustion zone 7 is another regenerative heat exchange zone 11 comprising a bed of heat absorption and storage material of the same character as that of zone 9. Between heat exchange zone 9 and gas connection 3 is a distribution/collection zone 13, and between a heat exchange zone 11 and 9as connection 5 is a distribution/collection zone 15. Valving (not shown) may be arranged to feed the contaminated gas stream into combustion zone 7 through gas inlet 3, distribution zone 13, and heat exchange zone 9 and withdraw combustion gas stream through heat exchange zone 11, collection zone 15, and gas exit 5, or to feed contaminated gas through zones 15 and 11 and withdraw combustion gas through zones 9 and 13. The valves are periodically operated to reverse the direction of flow through the system. Contaminated gas is moved through the system and combustion gas discharged by operation of a blower 17. As illustrated in the drawing, blower 17 is preferably located downstream of the means for removal of $SO_2$ from the combustion gas, as further described hereinbelow.

Figure 4:
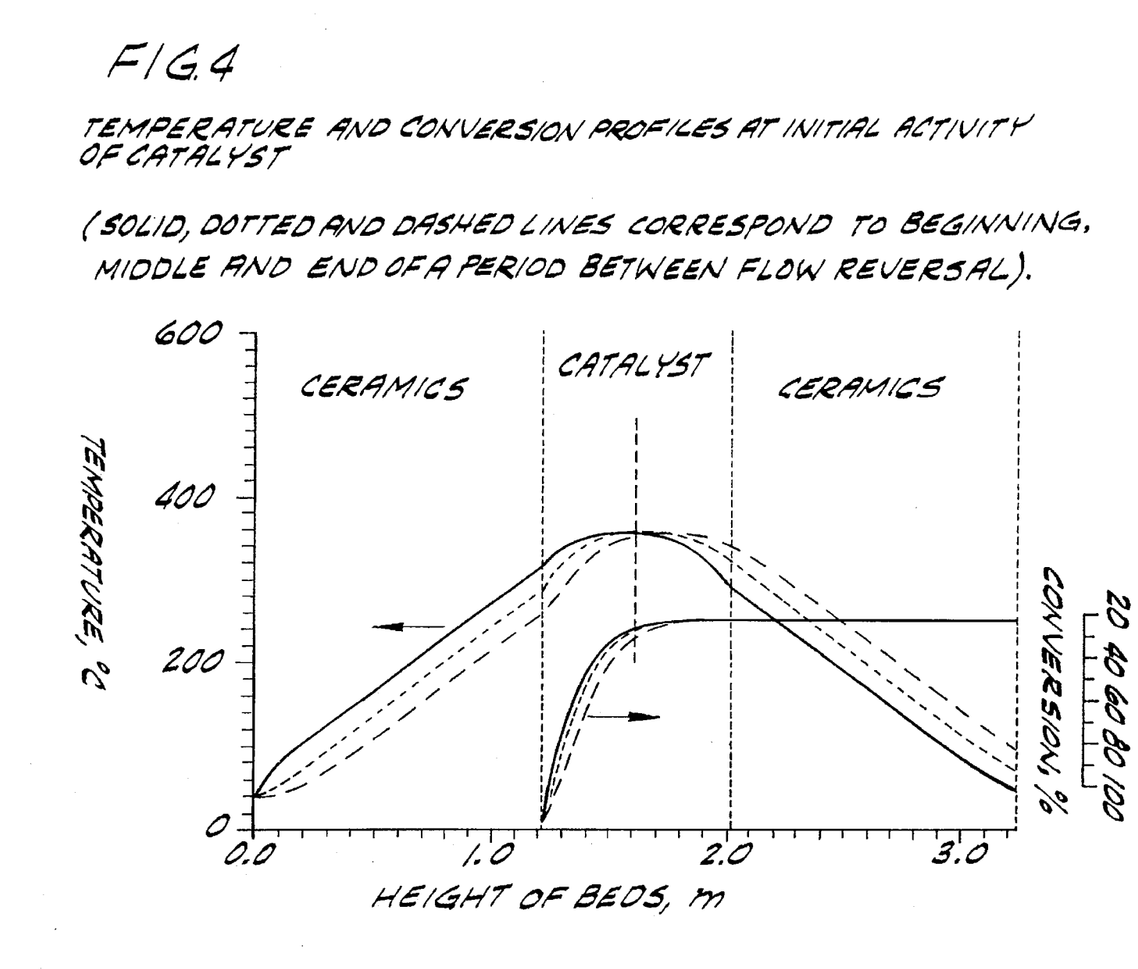
FIG. 4 shows a series of temperature and conversion profiles of the type which typically prevail at different times during a half cycle of normal operation of the system of FIG. 1 when the catalyst is fresh.

In operation of the process, contaminated gas is preheated by transfer of heat from preheating means comprising the heat absorption and storage material in the heat exchange zone (9, 11) upstream of the combustion zone, and the preheated gas enters the combustion zone via the interface between the combustion zone and the preheat zone. After reaction, combustion heat is transferred to the heat absorption and storage material in a cooling zone comprising the heat exchange zone (11, 9) downstream of the combustion zone. Operation during each half cycle is non-steady state with respect to temperature, the heat absorption and storage material in the preheat zone being progressively cooled by transfer of heat to incoming gas, and the heat absorption and storage material in the heat recovery zone being progressively heated by transfer of heat from the combustion gas exiting the combustion zone. Illustrated in FIG. 4 are typical temperature and conversion profiles across the preheat, combustion and cooling zones during a single half cycle when the catalyst is fresh. When the temperature in the heat recovery zone or collection zone rises to a predetermined level, or the temperature in the preheat zone falls to a predetermined level, the direction of flow through the system is reversed.

High temperature reaction in the combustion zone converts $H_2S$, COS, $CS_2$, and divalent organic sulfur compounds to $SO_2$, $H_2O$, and $CO_2$ according to the reactions set forth below for $H_2S$, COS, $CS_2$ and dimethyl sulfide:

Where the oxidation is catalytic, the combustion temperature is preferably in the range of between about 150° C. and about 600° C., most preferably about 250° C. to about 400° C. Thermal combustion is generally at somewhat higher temperature, i.e., in the range of between about 600° and about 1000° C. In operation at a catalytic combustion zone temperature of between about 250° C. and about 400° C., the contaminated feed gas is typically heated to a temperature of between about 150° C. and about 350° C. in the preheat zone (9, 11) and cooled to a temperature of about 65° C. to about 100° C. in the cooling zone (11, 9). Where thermal combustion is used, the gas is preferably preheated to a temperature of between about 600° C. and about 900° C. in the preheat zone, and is typically cooled to a temperature of between about 100° C. and about 200° C. in the cooling zone.

At the temperature of combustion, some of the sulfur dioxide is further oxidized to sulfur trioxide. Above the threshold activation temperature for conversion of $SO_2$ to $SO_3$, lower temperatures favor the formation of $SO_3$. Certain catalysts such as platinum group metals may also increase the extent of the conversion of $SO_2$ to $SO_3$. Where the contaminated gas contains volatile hydrocarbons as well as volatile divalent sulfur compounds, the hydrocarbons are burned to carbon dioxide and water. Commonly, the contaminated effluent stream does contain hydrocarbons, or other volatile organic compounds, which is often beneficial so far as operation of the process is concerned since the combustion of volatile organic compounds generates heat which conduces to autothermal operation of the process. Preferably, a volatile organic compound is presently a proportion of between about 10 ppm and about 1000 ppm by volume, more preferably between about 100 ppm and about 1000 ppm by volume. The common presence of oxygen in the contaminated gas stream is also useful since it may serve as the source of oxygen for oxidation of the divalent sulfur compounds and organic compounds. Advantageously, the contaminated gas stream may contain oxygen in a proportion sufficient for the substantially complete oxidation of all volatile organic sulfur compounds and all volatile organic compounds in the contaminated gas stream. In many instances, the available oxygen is well in excess of the requisite proportion. In the event that the contaminated gas stream contains insufficient oxygen, air may be bled into the waste stream to provide the oxygen necessary for combustion.

By way of example, a typical effluent gas stream from asphalt handling tanks may comprise between about 80% and about 90% by volume $N_2$, between about 10% and about 20% by volume oxygen, between about 0.01% and about 1.0% by volume volatile organic compounds (aliphatic and aromatic hydrocarbons), and between about 0.01% and about 0.02% by volume divalent organic sulfur compounds and $H_2S$. However, the process of the invention is adapted to deal with essentially any combination of divalent sulfur compounds, oxygen, volatile organic compounds and inert gases. Thus, the product gas stream can contain widely varying proportions of $SO_2$, $SO_3$, $CO_2$, and water. Where the volatile organic compound or volatile divalent sulfur compound contains other substituents such as halogens, the gas stream may contain other components such as HCl, HBr, etc.

In the process illustrated in FIG. 1, cooled combustion gas exiting the cooling zone of the reactor is contacted with a scrubbing liquid for removal of sulfur oxides. The scrubbing medium preferably comprises an aqueous solution or slurry of an alkaline material such as sodium hydroxide, calcium carbonate, calcium hydroxide or magnesium hydroxide, with a pH between about 6 and about 9. As illustrated in FIG. 1, the cooled combustion gas stream is introduced into an inlet 19 at the lower end of an absorption tower 21, below an absorption zone 23 within the tower which comprises packing or other means for promoting intimate contact and mass transfer between gas and liquid. A liquid absorbing medium is introduced into tower 21 via a liquid inlet 25 above the absorption zone. Gas passes upwardly through the absorption zone countercurrently to liquid flowing down through the zone. Absorption liquor exits the tower through a liquid exit line 27 and cleaned gas exits the top of the tower through outlet 29. Where packed tower is used, the absorption medium is preferably a solution, most preferably a caustic soda solution rather than a slurry such as lime slurry.

In absorber 21 the gas is cooled from a temperature in the range of about 65°–100° C. to a temperature in the range of about 30°–85° C., thereby typically heating the absorption medium from about 20° to about 30° C. Cooling of the combustion gas and contact of the gas with a cool aqueous scrubbing medium generally results in the formation of mist in the gas stream. Such mist may include entrained liquid from the absorption liquor but a significant and potentially troublesome source of mist is liquid $SO_3$ or $H_2SO_4$ condensed as a fine fog in the gas phase during cooling of the combustion gas. Prior to leaving the tower through exit 29, gas exiting the top of the absorption zone is preferably passed through a mist eliminator 31 for removal of liquid mist from the gas stream. Passage of the gas exiting the absorption zone through a mist eliminator, such as that sold by Monsanto Enviro-Chem under the trade designation Brink Mist Eliminator, is effective for removing $SO_3$ and other mist components from the exit gas stream and combining them with the absorption liquor exiting the absorber. Advantageously, as illustrated in FIG. 1, the mist eliminator and the absorption zone are contained within the same housing or tower advantageously with the mist eliminator positioned above the absorption zone in the tower.

Although scrubbing with an aqueous alkaline absorption medium is preferred, $SO_2$ may be separated from the combustion gas using other means of separation. For example, the $SO_2$ may be adsorbed on an $SiO_2$, solid CaO, or activated carbon adsorbent, and recovered using a pressure swing or temperature swing cycle. Alternatively, $SO_2$ and other $SO_x$ may be removed from the gas stream by chemical binding to oxides and sulfides of Fe, Zn or Cu. In a further alternative, where $SO_2$ is recovered by absorption or adsorption, it may be concentrated on desorption and catalytically converted to $SO_3$ for the production of sulfuric acid.

Figure 2:
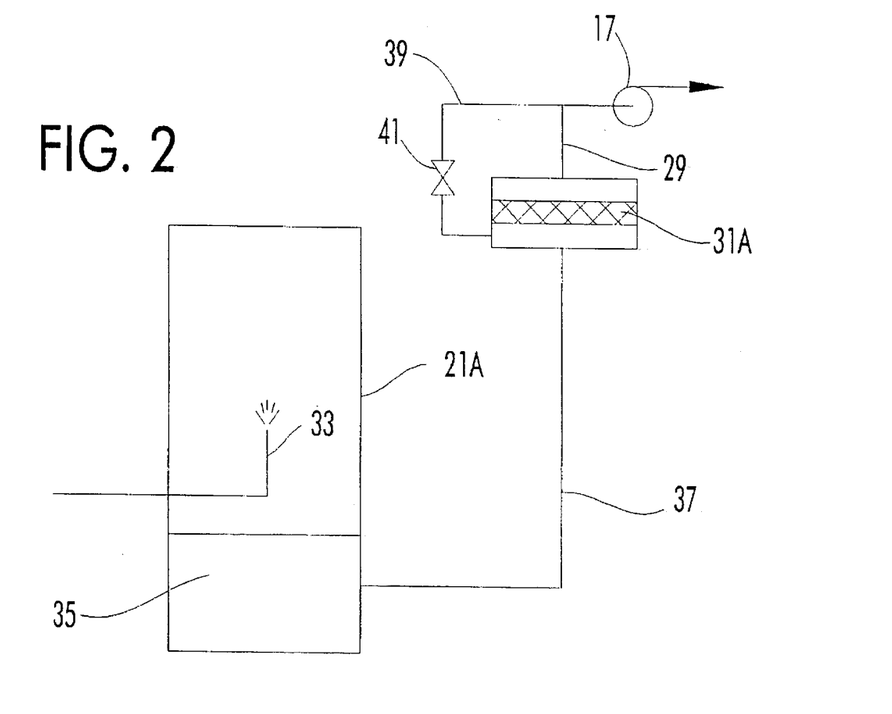
FIG. 2 is a schematic illustration of a particularly preferred feature of the process of FIG. 1 comprising an absorption zone for scrubbing of $SO_2$ contained in the combustion gas from a thermal or catalytic oxidation zone, followed by a mist eliminator for removal of $SO_3$ and other liquid mist.

FIG. 2 illustrates a preferred embodiment of the invention in which absorption of sulfur oxide gases is conducted using a reverse jet scrubber. The scrubber comprises a tubular vessel 21A through which the gas flows at high velocity countercurrently to scrubbing liquid introduced through a nozzle 33. The ratio of liquid to gas flow in the scrubber is preferably between about 20 and about 50 gallons scrubbing medium per 1000 actual cubic feet of gas. The tubular vessel is preferably sized so that the superficial gas velocity is greater than the flooding velocity, e.g., over 1000 fpm, more preferably between about 1500 and about 3000 fpm. The liquid velocity is sufficient to generate more than one jet horsepower per square foot of cross-sectional area of the tubular vessel. As a consequence, a zone of intense turbulence is created. To facilitate liquid flow reversal, vessel 21A is vertically oriented, and preferably the gas flows downwardly and the liquid jet flows upwardly in the tubular vessel. The nature and operation of the reverse jet scrubber are further described in U.S. Pat. No. 3,803,805, which is expressly incorporated herein by reference.

In the embodiment of FIG. 2, liquid and gas are separated in a sump 35 below the scrubber and gas is removed from the scrubber via blower 17 and a vertical exhaust line 37. A mist eliminator 31A is located in line 37 for removal of liquid mists, including $SO_3$ from the exhaust gas stream. Advantageously, the reverse jet scrubber, sump, blower, exhaust line and mist eliminator may be fabricated, shipped and installed as a single integrated piece of equipment.

Over an extended period of operation, oxidation of volatile divalent sulfur compounds produces sulfite and sulfate salts which tend to deposit on the surfaces of the catalyst in combustion zone 7 (FIG. 1), and on the inert heat storage material contained within regenerative heat exchange zones 9 and 11. Accumulation of sulfate and sulfite salts occludes the surface of the catalyst within the combustion zone, eventually resulting in a significant degradation of catalyst activity. Accumulation of these salts on the surfaces of the heat storage material interferes with heat transfer and increases flow resistance and pressure drop in the regenerative heat transfer reaction system.

Figure 5:
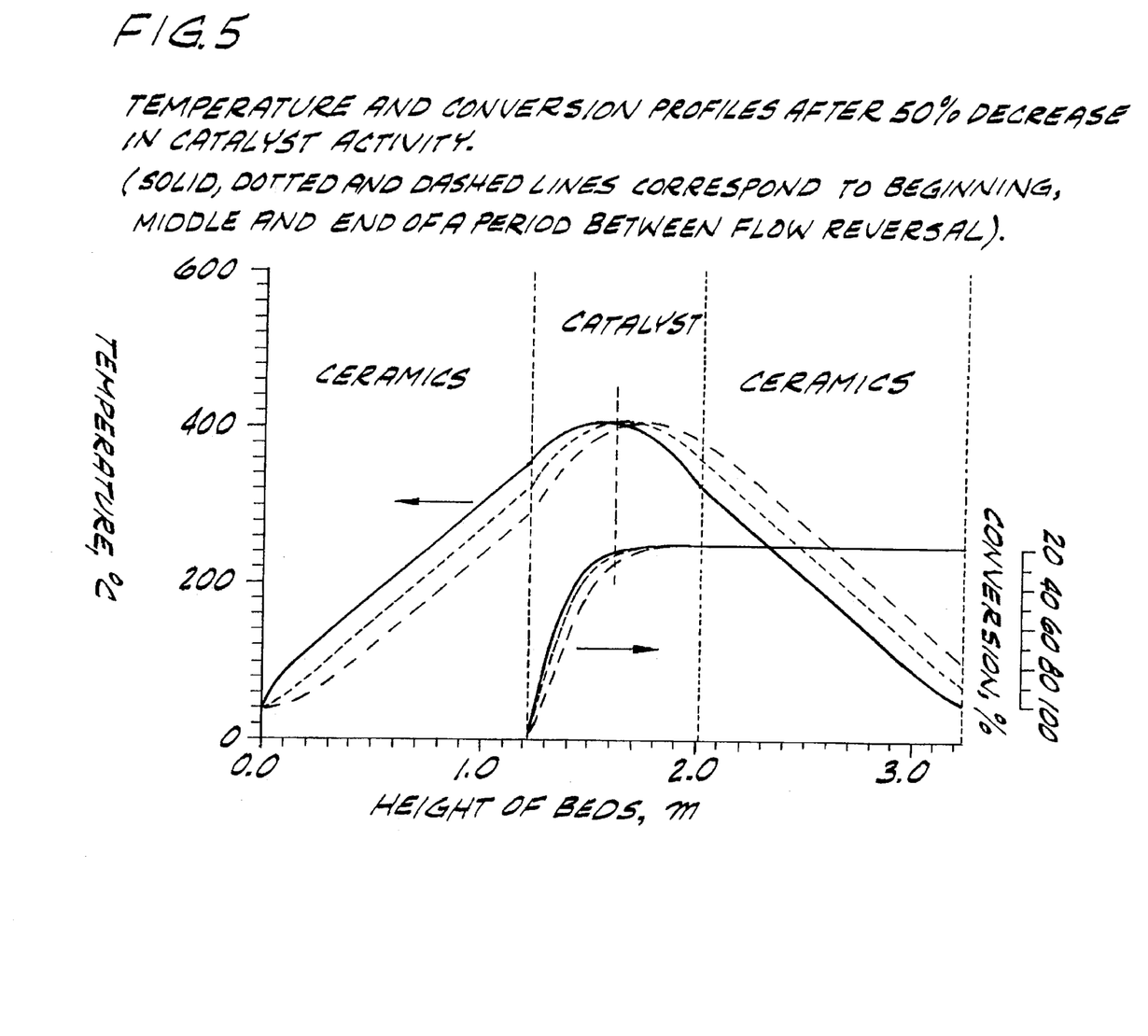
FIGS. 5 and 6 show temperature and conversion profiles of the type illustrated in FIG. 4 during a half cycle of normal operation when the catalyst activity has declined by 50% and 75%, respectively.
Figure 6:
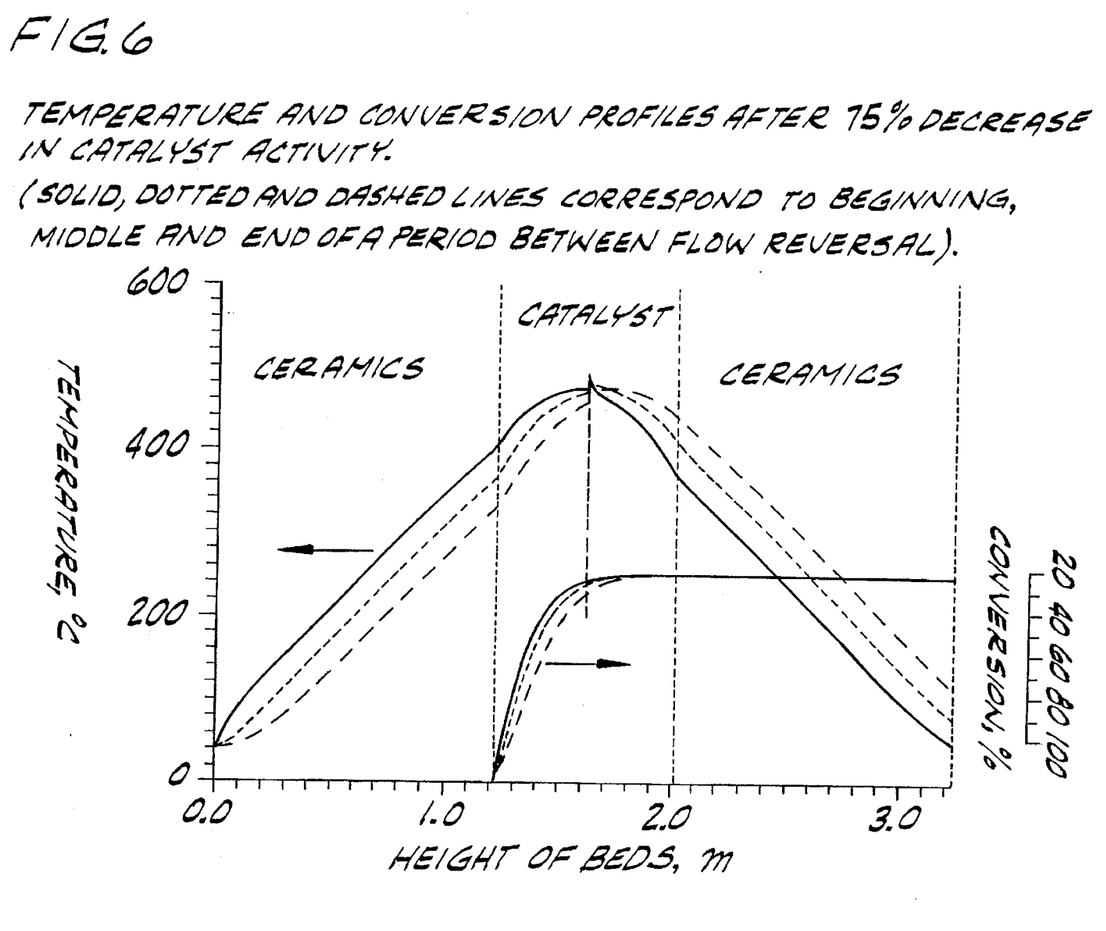

FIG. 5 illustrates typical temperature and conversion profiles across the heat exchange and catalytic combustion zones after catalyst activity has declined by 50%. Note that conversion is maintained constant by allowing the peak operating temperature to rise from about 350° C. when the catalyst is fresh (FIG. 4) to about 400° C. when the activity has declined by 50%. By the time the catalyst activity has declined by 75% (FIG. 6), peak operating temperature is about 480° C.

Figure 7:
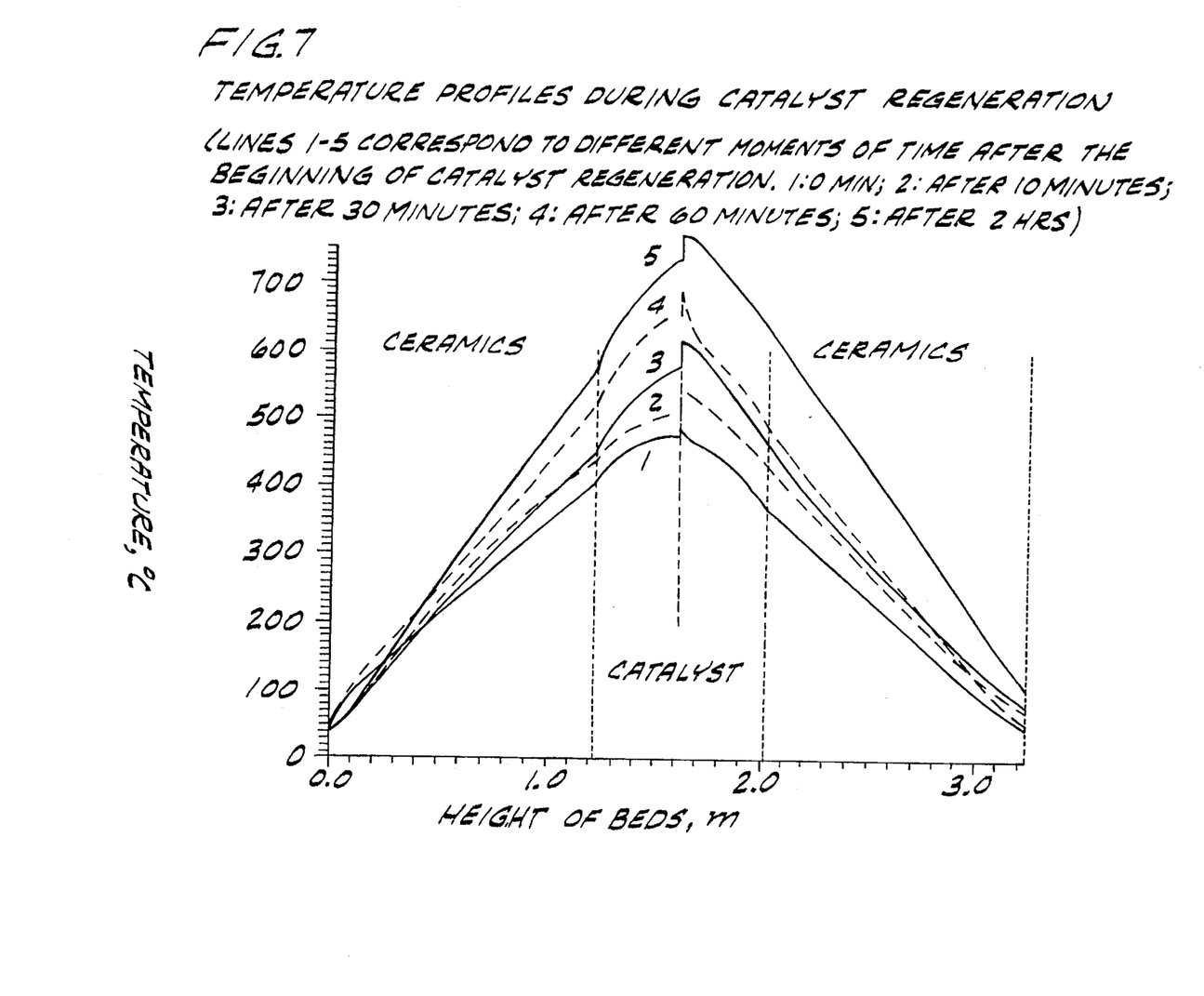
FIG. 7 presents a series of temperature profiles of the type which prevail during the reactivation of a regenerative heat transfer catalytic reaction system in accordance with the method of the invention.

In order to reactivate the catalyst and restore proper operation of the heat transfer system, the salts are removed by decomposition. In accordance with the invention, it has been discovered that the catalyst may be reactivated in situ during continuing operation of the process. Thus, adequate catalyst activity is preserved for removal of $SO_x$, while process downtime is minimized in both the effluent treatment process of the invention and the manufacturing or processing operation whose effluent is directed to this treatment process. Decomposition of sulfate and sulfite salts is effected by raising the temperature substantially throughout the catalyst bed, and preferably substantially throughout the entire regenerative heat transfer system to at least about 550° C., preferably between 550° C. and about 800° C. Reactivation temperature profiles are illustrated, for example, in FIG. 7. Where the fuel value of the contaminated gas is sufficiently high, reactivation may be accomplished by shortening the flow reversal cycle of the regenerative system, for example, from a normal full cycle period of between about 30 minutes and about 40 minutes, to a full cycle period of between about one half minute and about 5 minutes, preferably in the neighborhood of one minute. Since the driving force for heat transfer is substantially greater during the heating phase, i.e., transfer of heat from the combustion gas to the heat storage material, than during the cooling phase, i.e., transfer of heat from the heat storage material to the incoming contaminated gas stream, shortening the cycle results in substantial heat accumulation in the entire system.

Although shortening the reversal cycle is effective to extend the zone of maximum temperature throughout the catalyst bed, and substantially throughout the heat storage beds as well, this stratagem is not as effective to substantially raise the maximum temperature in the system. Where the fuel value of the contaminated gas stream is insufficient to allow the salt decomposition temperature to be attained by shortening the cycle alone, heat from a supplemental source may be added to bring the gas stream entering the combustion zone to the requisite temperature. At temperatures in the range of between about 550° C. and about 800° C., decomposition of the salts may typically requires between about 60 and about 1500 minutes. During the reactivation cycle, the $SO_x$ content of the gas leaving the reactor is elevated. Accordingly, completion of the reactivation step may be determined by monitoring the $SO_x$ content of the exit gas, or conveniently by monitoring the sulfate and sulfite content of the absorption liquor exiting the absorber.

Gas flows and pressure drops tend to be substantially higher during reactivation than during normal operation of the process of the invention. Pressure drop in the mist eliminator may be especially high during reactivation. A by-pass line 39 containing a valve 41 is optionally provided to allow the mist eliminator to be bypassed by the cleaned exhaust gas during reactivation operation (FIG. 2). After reactivation is complete, valve 41 is closed for resumption of normal operation.

In a preferred embodiment of the invention, by-passing of contaminated gas around the regenerative heat transfer reaction system at the time of flow reversal is avoided by use of the system described in U.S. Pat. No. 5,366,708, the disclosure of which is hereby expressly incorporated by reference. In a further preferred embodiment of the invention, overheating of the catalyst which may otherwise result from wide variations in VOC content of the contaminated gas is avoided by a venting system which is adapted to by-pass combustion gas around the cooling zone, by-pass contaminated feed gas around the preheating zone, and/or draw air into the system whenever the temperature in the reaction system approaches a temperature at which thermal degradation of the catalyst might otherwise occur. According to this preferred embodiment of the invention, the temperature is measured at a selected location in the catalyst bed, and whenever the temperature at that location meets or exceeds the selected value, at least a portion of the combustion gas stream is diverted so that it by-passes at least a part of the regenerative heat exchange zone for recovery of reaction heat. As a consequence, the heat recovery zone downstream of the reaction zone does not absorb as much heat, and is, therefore, not heated to as high a temperature, as would otherwise have been the case. When the direction of gas flow through the system is reversed in the next half cycle, the inlet gas does not absorb as much heat from the heat exchange zone that has now been reversed from heat recovery to preheat. Thus, in the next cycle, the combustion zone is not exposed to temperatures as high as those which would otherwise have been experienced. By this chain of factors, a catalyst and/or inert heat storage material may be protected from excessively rapid thermal degradation, and mechanical integrity of equipment components may be protected. Alternatively, the same result is achieved by diverting at least a portion of the contaminated feed gas stream entering the system so that it by-passes at least a part of the regenerative heat exchange zone for preheating gas prior to reaction, but is introduced into the reaction zone for conversion of reactants to reaction product. A venting system which allows ambient air to enter and cool the system operates on the same principle.

Figure 8:
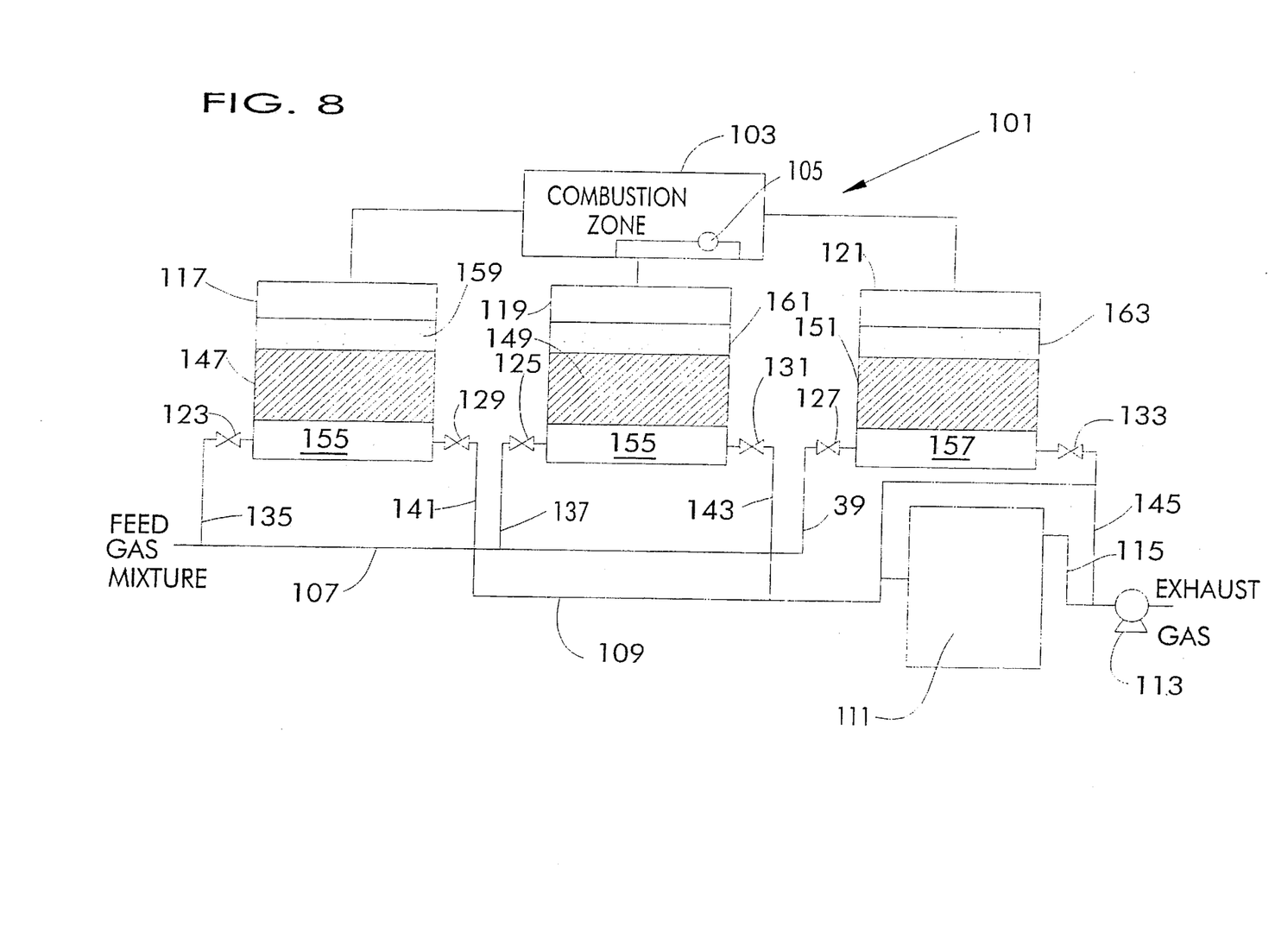
FIG. 8 is a schematic illustration of a regenerative heat transfer reaction system of the invention utilizing three chambers containing heat storage and heat transfer packing.

As illustrated in FIG. 8, the process of the invention may be advantageously carried out in a regenerative incinerator of the type illustrated in Matros U.S. Pat. No. 5,364,259, which is expressly incorporated herein by reference. FIG. 8 shows a regenerative incinerator generally depicted by numeral 101. The incinerator comprises a thermal combustion stage 103 provided with a supplemental heat source 105 such as burners or electric heaters. The incinerator 101 further comprises an intake manifold 107 and an exhaust manifold 109. The contaminated gas feed mixture enters the incinerator 101 through intake manifold 107 and reacted gas is discharged to absorber 111. Blower 113 connected to gas exit 115 of absorber 111 pulls the gas through the incinerator.

The incinerator 101 further comprises three separately housed chambers 117, 119, and 121 in fluid communication with the thermal combustion stage 103, the intake manifold 107 and the exhaust manifold 109. Associated with the chambers 117, 119, and 121, are intake valves 123, 125, and 127 and exhaust valves 129, 131, and 133, respectively. While chamber 117, 119 or 121 is operating in the intake mode, intake valve 123, 125, or 127 allows feed gas mixture to flow from intake manifold 107 and enter the corresponding chamber via lines 135, 137 or 139, respectively. While chamber 117, 119, or 121 is operating in the exhaust mode, exhaust valves 129, 131 or 133 allows reacted gas to flow from the corresponding chamber to exhaust manifold 109 via lines 141, 143 or 145, respectively.

Each chamber 117, 119, and 121 contains a layer or heat exchange material 147, 149 and 151, respectively, disposed above a gas distribution/collection zone 153, 155 and 157, respectively. Preferably, the heat exchange material has an average heat capacity greater than 0.15 cal/cm$^3$, more preferably greater than 0.2 cal/cm$^3$. Suitable heat exchange materials include ceramics such as $SiO_2$ and $Al_2O_3$, stoneware and mineral matter. Due to the relatively low operating temperatures, the heat content of the gas exiting the thermal combustion stage 103 is reduced. Thus, a smaller quantity of heat exchange material may be used in the chambers 117, 119 and 121, thereby reducing the pressure drop across the incinerator 101. Alternatively, the quantity of heat exchange material may not be reduced in the incinerator 101 of the present invention so as to provide increased heat holding capacity and allow even longer heat cycle periods.

Preferably, each chamber 117, 119 and 121 further contains a catalytic combustion stage comprising a catalyst layer 159, 161 and 163, respectively. The catalyst layer 159, 161 and 163 is disposed such that when the chambers are being operated in the intake mode the feed gas mixture contacts heat exchange material before contacting the catalyst material. Operation of the heat source 105 is preferably controlled such that the operating temperature of the catalyst layers 159, 161 and 163 is greater than about 150° C. and less than about 700° C.

The process of the present invention employing a six-phase (phases A through F) heat cycle is now described.

In phase A, valves 123 and 131 are opened and valves 129, 125, 127, and 133 are closed so that chamber 117 is operated in the intake mode, chamber 121 is operated in the exhaust mode and chamber 127 is static. Feed gas mixture, typically at a temperature of 20° to 100° C., enters gas distribution/collection zone 153 of chamber 117. Distribution/collection zone 153 promotes relatively uniform flow of contaminated feed gas mixture through heat exchange layer 147. The contaminated feed gas is heated as it flows through heat exchange layer 147 and is substantially reacted in catalytic combustion stage 159. The reacted gas then flows to thermal combustion stage 103 which is operated at a temperature not in excess of 850° C., and preferably between 150° and 600° C., by operation of the supplemental heat source 105 as needed. Due to the relatively low operating temperatures, only a negligible amount of any combustible components remaining in the gas are ordinarily oxidized in thermal combustion stage 103. The gas then flows through chamber 119 where any remaining unreacted components of the feed gas are reacted in catalytic combustion stage 161. Together, thermal stage 103 and catalytic stages 159 and 161 constitute the combustion zone of the process and apparatus during phase A of operation. As the gas flows through chamber 119, it transfers heat to catalyst layer 161 and heat exchange layer 149. The cooled gas then exists chamber 119 and flows via line 143 to exhaust manifold 109.

After heat exchanger layer 147 is cooled to a preselected temperature, heat exchange layer 149 is heated to a preselected temperature, or a prescribed period of time elapses, gas flow through the incinerator 101 is redirected by closing valves 131 and opening valve 133 to initiate phase B of the cycle. Typically, the duration of phase A is between about 2 minutes and about 10 minutes, although longer or shorter periods may be employed.

In phase B, chamber 117 is operated in the intake mode, chamber 119 is static and chamber 121 is operated in the exhaust mode. Phase B is an intermediate step in the change-over of chamber 119 from the exhaust mode to the intake mode which allows gas to flow continuously through the incinerator 101 during the change-over without discharge of unreacted feed gas mixture from the incinerator 101 which may occur if valves 125 and 131 are repositioned simultaneously. Thus, the duration of phase B, typically 5 to 10 seconds, need only be long enough to reposition valve 131 to its closed position.

After valve 131 is closed, valve 125 is opened and valve 123 is closed to initiate phase C of the cycle. In phase C, chamber 117 is static, chamber 119 is operated in the intake mode and chamber 121 is operated in the exhaust mode. After heat exchange layer 149 is cooled to a preselected temperature, heat exchange layers 151 is heated to a preselected temperature, or a prescribed period of time elapses, phase D of the cycle is initiated by opening valve 129 and closing valve 133. Similar to phase B, phase D is an intermediate step in the change-over of chamber 121 from the exhaust mode to the intake mode.

After valve 133 is closed, valve 127 is opened and valve 125 is closed to initiate phase E of the cycle. During phase E, chamber 117 is operated in the exhaust mode, chamber 119 is static and chamber 121 is operated in the intake mode. After heat exchange layer 151 is cooled to a preselected temperature, heat exchange layer 147 is heated to a preselected temperature, or a prescribed period of time elapses, phase F, the final phase of the cycle, is initiated by opening valve 131 and closing valve 129. Similar to phases B and D, phase F is an intermediate step in the change-over of chamber 117 from the exhaust mode to the intake mode.

Once valve 129 is closed, a new heat cycle is initiated by opening valves 123 and closing valve 127. The position of the valves in each of the six phases of the process described above and typical phase times are summarized in Table I.

bons were removed from a gas stream containing 10–1000 ppm by volume of S-containing compounds, 100–1000 ppm by volume VOC. The temperature of the catalytic combustion zone was controlled at between about 480° C. and 595° C. by supply of supplemental fuel whenever the temperature dropped to about 480° C., and by venting combustion gas around the regenerative heat transfer cooling zone whenever

TABLE I

| PHASE | CHAMBER | DESCRIPTION | 123 | 129 | 125 | 131 | 127 | 133 | TIME |
|---|---|---|---|---|---|---|---|---|---|
| A | 117 | Intake | O | C | | | | | 2–10 min. |
| | 119 | Exhaust | | | C | O | | | |
| | 121 | Static | | | | | C | C | |
| B | 117 | Intake | O | C | | | | | 5–20 sec. |
| | 119 | Static | | | C | O | | | |
| | 121 | Exhaust | | | | | C | O | |
| C | 117 | Static | C | C | | | | | 2–10 min. |
| | 119 | Intake | | | O | C | | | |
| | 121 | Exhaust | | | | | C | O | |
| D | 117 | Exhaust | C | O | | | | | 5–20 sec. |
| | 119 | Intake | | | O | C | | | |
| | 121 | Static | | | | | C | C | |
| E | 117 | Exhaust | C | O | | | | | 2–10 min. |
| | 119 | Static | | | C | C | | | |
| | 121 | Intake | | | | | O | C | |
| F | 117 | Static | C | C | | | | | 5–20 sec. |
| | 119 | Exhaust | | | C | O | | | |
| | 121 | Intake | | | | | O | C | |

O: Open
C: Closed

As discussed in U.S. Pat. No. 5,364,259, the process and apparatus described in FIG. 8 may be modified in various ways. For example, phases B, D, and F of the operating cycle, though preferred, may be eliminated. Also, it should be understood that the invention is applicable to three chambers or more and that the process of the invention provides similar advantages for incinerators comprising additional chambers. Furthermore, each of the chambers may contain a second layer of heat exchange material disposed such that the catalyst layers are interposed between two layers of heat exchanger material. In the latter system, the combustion zone is usually limited to the catalytic stage in the chamber where reaction is initiated.

Figure 3:
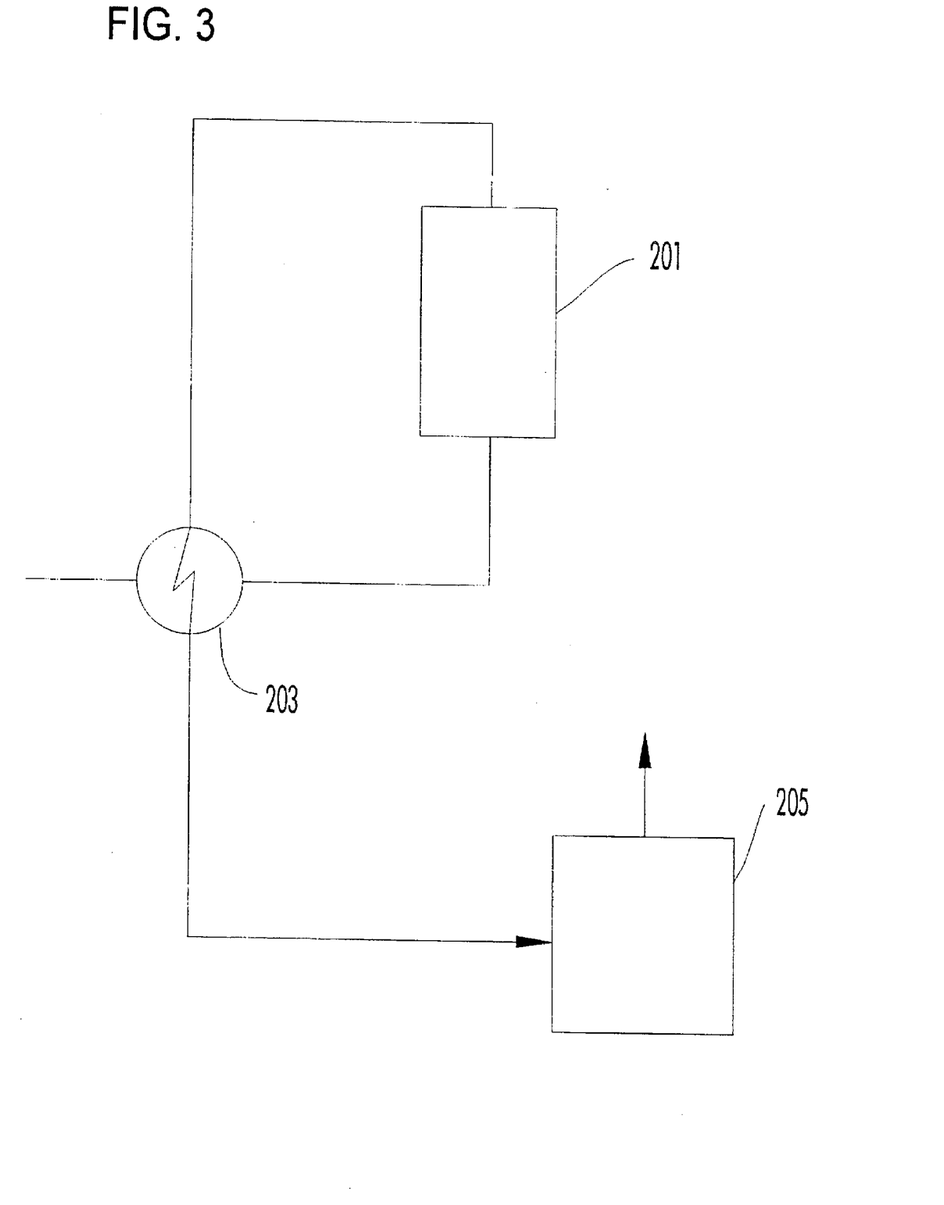
FIG. 3 is a schematic illustration of the process of the invention using recuperative rather than regenerative heat recovery for preheating the contaminated gas entering the oxidation zone.

Although the use of a regenerative heat transfer reaction system is highly preferred, the process of the invention may also be carried out using recuperative heat transfer for preheating the contaminated gases entering the combustion zone. FIG. 3 illustrates such a system. Divalent sulfur compounds are oxidized in the combustion zone of a thermal or catalytic reactor 201. Contaminated gas entering the combustion zone is preheated by transfer of heat from combustion gas in an indirect heat exchanger 203. In this system, where the combustion gas leaves the reactor at a temperature of between about 200° C. and about 600° C., gas entering the reaction zone is typically heated in heat exchanger 203 to a temperature of between about 150°–350° C., and the combustion gas is cooled to between about 140° C. and about 300° C. In this case, reactivation of catalyst will ordinarily require a supplemental source of fossil fuel to increase the temperature in the reaction zone sufficiently for decomposition of the sulfite and sulfate salts. Sulfur oxides are removed in a separation device, e.g., an absorber or adsorber, 205.

EXAMPLE

Using a system of the type depicted in FIGS. 1 and 2, volatile divalent sulfur compounds and volatile hydrocarthe temperature approached 595° C. This control system allowed the combustion zone to be maintained within the aforesaid limits using only natural gas as a fuel source in a proportion not greater than 25% of the lower explosion limit at the gas inlet to the combustion zone.

The temperature of the contaminated gas stream entering the preheat zone was typically 7 to 12° C. hotter than ambient and the outlet temperature from the cooling zone ranged from 65° to 95° C. depending on the temperature of the outlet ceramic heat absorption material, a temperature which varies through each cycle.

The total flow through the system was 700 to 850 acfm measured at inlet conditions. The pressure drop at this flow was approximately 5" water column. The average full cycle duration was 25 to 30 minutes based on a switching temperature of 250° C. measured in the center of the downstream regenerative heat transfer (cooling) zone packing. With the temperature in the catalyst zone typically ranging from 480° C. to 565° C., the interface temperature ranged from 315° C. to 430° C. and the temperature of the inert packing in the regenerative heat transfer zones ranged from 230° C. to 315° C.

SO$_x$ was absorbed from the cooled combustion stream in a reverse jet absorber of the type of available under the trade designation DYNAWAVE® from Monsanto Enviro-Chem Systems, Inc., St. Louis. The absorption medium was an aqueous solution controlled at a pH of 6 to 8 by the addition of a solution containing 50% by weight sodium hydroxide. This scrubbing medium was circulated from the sump of the absorber through the reverse jet nozzle at a flow rate of 70–80 gallons per minute. Transfer of SO$_x$ from the gas to the liquid phase formed sodium sulfate and sodium sulfite salts in the absorption medium. To remove sulfites and sulfates from the absorber, absorption liquor was removed from the circulating system at a rate of approximately 30 gallons per day, controlled to maintain a specific gravity below 1.2.

Gas exiting the bottom of the reverse jet absorber was separated from the absorption liquor in the sump and exhausted to the atmosphere through the blower and mist eliminator. The mist eliminator was a system available from Monsanto Enviro-Chem Systems, Inc. under the trade designation "Brink".

During continuing operations, $SO_x$ compounds were observed to adsorb and accumulate on the catalyst the inert heat storage material and other parts of the regenerative heat transfer reaction vessel. Thus, on a monthly basis, the operation of the system was modified to reactivate the catalyst and remove the $SO_x$ compounds from the inert heat storage material as well. To effect reactivation, the reversal cycle was shortened to about 1 minute and supplemental fuel added as needed to achieve a temperature substantially throughout the catalyst bed, and substantially throughout the inert material, of about 705° C. for 24 to 36 hours. In order to avoid inadvertent increase of the temperature to significantly greater than 705° C., which could have damaged the catalyst used in this system, reactivation was conducted during periods of relatively low volatile organic compound content of the contaminated gas stream, in which circumstance the temperature in the catalyst bed could be positively controlled by throttling the addition of supplemental fuel.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawing [s] shall be interpreted as illustrative and not in a limiting sense.

What is claimed is:

1. A process for removing a volatile sulfur compound selected from the group consisting of hydrogen sulfide, carbon disulfide, carbonyl sulfide, organic sulfur compounds and mixtures thereof from a contaminated gas stream comprising:

reacting in a combustion zone said volatile sulfur compound contained in a gas stream with oxygen in or upstream of a bed comprising a catalytic material, thereby producing a combustion gas containing sulfur oxide, said sulfur oxide predominantly comprising sulfur dioxide wherein the surfaces of said bed becoming progressively coated with sulfite and/or sulfate salts by deposit thereof from the gas stream, and removing said sulfate and/or sulfite salts from said bed in situ while continuing to introduce said contaminated gas stream into said combustion zone and oxidizing said volatile sulfur compound in said combustion zone to produce said combustion gas, said sulfite and/or sulfate salts being removed from said bed by heating said catalyst bed to a reactivation temperature at which said salts are decomposed to sulfur oxide gases, said sulfur oxide gases being purged from said combustion zone.

2. A process as set forth in claim 1 wherein said contaminated gas stream is preheated prior to reaction of said volatile sulfur compound with oxygen.

3. A process as set forth in claim 1 wherein said combustion gas stream is cooled prior to separation of sulfur dioxide therefrom.

4. A process as set forth in claim 1 comprising a further step of separating sulfur dioxide from said combustion gas comprising contacting said combustion gas with a liquid scrubbing medium effective for absorption of sulfur dioxide from said gas stream.

5. A process as set forth in claim 4 wherein said scrubbing medium comprises an aqueous liquid containing an alkaline agent reactive with sulfur dioxide.

6. A process as set forth in claim 5 wherein said scrubbing medium comprises a solution containing an alkali metal hydroxide.

7. A process as set forth in claim 6 wherein said scrubbing medium comprises a slurry in which is suspended an alkaline earth hydroxide.

8. A process as set forth in claim 5 wherein said combustion gas is contacted with said scrubbing medium in a reverse jet scrubber absorption zone.

9. A process as set forth in claim 8 wherein the liquid scrubbing medium is delivered to said absorption zone at such flow rate that the ratio of liquid to gas flow in said absorption zone is between about 20 and about 50 gallons liquid/actual 1000 ft$^3$ gas.

10. A process as set forth in claim 9 wherein the superficial gas velocity in said absorption zone is between about 30 and about 70 ft/min.

11. A process as set forth in claim 4 wherein said combustion gas is contacted with said scrubbing liquid in an absorption zone, the gas exiting said absorption zone being passed through a mist eliminator for removal of liquid mist therefrom.

12. A process as set forth in claim 11 wherein said absorption zone and said mist eliminator are contained in a single housing.

13. A process as set forth in claim 1 wherein said contaminated gas stream contains oxygen which is reacted with said volatile sulfur compound and said volatile organic compound.

14. A process as set forth in claim 13 wherein said contaminated gas stream contains oxygen in a proportion sufficient for the substantially complete oxidation of all volatile organic sulfur compounds and all volatile organic compounds contained in said contaminated gas stream.

15. A process as set forth in claim 1 wherein said sulfur compound is reacted with oxygen in a combustion zone into which supplemental fuel is also introduced and burned with oxygen to maintain the combustion zone at a temperature sufficient for combustion of the sulfur compound with oxygen.

16. A process a set forth in claim 1 wherein said bed comprises a catalyst for the combustion reaction which becomes degraded and loses activity due to deposition of said sulfite and sulfate salts thereon, said reactivation being effective to regain at least some of the lost catalyst activity.

17. A process as set forth in claim 16 wherein said catalyst is selected from the group comprising a platinum group metal and a mixture of chromium oxide and copper oxide.

18. A process as set forth in claim 17 wherein said catalyst comprises between about 3% and about 10% by weight $Cr_2O_3$ and between about 3% and about 10% by weight CuO on an alumina support.

19. A process as set forth in claim 17 wherein said catalyst comprises between about 0.1% and about 1% by weight Pt on an alumina support.

20. A process as set forth in claim 1 wherein said reactivation temperature is at least about 550° C.

21. A process as set forth in claim 20 wherein the temperature substantially throughout said combustion zone is increased to at least 550° C. by introduction of heat from a supplemental source into said combustion zone.

22. A process as set forth in claim 1 wherein said combustion zone comprises a fixed catalyst bed comprising a particulate catalyst having an average particle size of between about 4 mm and about 40 mm.

23. A process as set forth in claim 1 wherein said combustion zone contains a monolithic catalyst in the configuration of a honeycomb.

24. A process as set forth in claim 1 wherein said combustion zone is in fluid communication with at least three chambers, each chamber having a separate housing and containing a layer of heat storage material, the chambers being in selective fluid communication with an inlet manifold and an exhaust manifold such that each chamber is selectively operable in an intake mode and an exhaust mode, each chamber having a layer of catalyst disposed therein, the layer of catalyst material being disposed in each of the chambers such that when the chambers are operated in the intake mode the feed gas mixture flowing through the chambers contacts heat exchange material before contacting the catalyst material.

25. A process as set forth in claim 1 wherein said contaminated gas stream further comprises a volatile organic compound comprising a hydrocarbon, halogenated hydrocarbon or mixtures thereof.

26. A process as set forth in claim 25 wherein said combustion zone is in fluid communication with at least three chambers, each chamber having a separate housing and containing a layer of heat storage material, the chambers being in selective fluid communication with an inlet manifold and an exhaust manifold such that each chamber is selectively operable in an intake mode and an exhaust mode, each chamber comprising a combustion zone, the combustion zone the layer of catalyst material being disposed in each of the chambers such that when the chambers are operated in the intake mode the feed gas mixture flowing through the chambers contacts heat exchange material before entering the combustion zone.

27. A process as set forth in claim 26 wherein each of said combustion zones contains a catalyst for the combustion reaction.

28. A process as set forth in claim 25 wherein said contaminated gas stream contains between about 10 and about 1000 ppm of said volatile sulfur compound and between about 100 and about 1000 ppm of said volatile organic compound.

29. A process for removing a volatile sulfur compound from a contaminated gas stream comprising:

reacting a volatile sulfur compound selected from the group consisting of hydrogen sulfide, carbon disulfide, carbonyl sulfide, organic sulfur compounds, and mixtures thereof, with oxygen in the presence of a catalyst within a catalytic combustion zone of a regenerative heat transfer reaction system to produce a combustion gas containing sulfur oxide, said sulfur oxide predominantly comprising sulfur dioxide, wherein the surfaces of said catalyst become progressively coated with sulfite and/or sulfate salts by deposit thereof from the gas stream; and recurrently removing said sulfate and/or sulfite salts from said catalyst in situ while continuing to introduce said contaminated gas stream into said combustion zone and oxidizing said volatile sulfur compound in said combustion zone to produce said combustion gas, said sulfite and/or sulfate salts being removed from said catalyst by heating said catalyst to a reactivation temperature at which said salts are decomposed to sulfur oxide gases, said sulfur oxide gases being purged from said combustion zone;

said system comprising said catalytic combustion zone and at least two regenerative heat exchange zones, in one of said regenerative heat exchange zones the combustion gas exiting the combustion zone being passed over a heat storage material which absorbs heat transferred from the combustion gas, and in the other of said heat exchange zones the contaminated gas stream being passed over a heat storage material from which stored heat is transferred to the contaminated gas stream before the gas enters the combustion zone, the flow of gas being periodically reversed through a continuing series of cycles so that heat that has been absorbed from the combustion gas is used to preheat the contaminated gas entering the combustion zone.

30. A process as set forth in claim 29 wherein said heat storage material comprises a fixed bed of solid material, said sulfite and sulfate salts depositing on the surfaces of said heat storage material, said reactivation being effective to remove sulfite and sulfate salts from said heat storage material.

31. A process as set forth in claim 29 wherein increasing the temperature of the catalyst substantially throughout said combustion zone to said reactivation temperature comprises shortening the length of the flow reversal cycles.

32. A process as set forth in claim 31 wherein the period of said cycles is between about 1.5 and about 60 minutes except during reactivation, the period of time of the cycles being between about one half minute and about 5 minutes during reactivation.

33. A process as set forth in claim 31 wherein the temperature of said combustion zone is maintained at said reactivation temperature for a reactivation period of between about 60 and about 1500 minutes to effect removal of said sulfite and/or sulfate salts from said catalyst.

34. A process as set forth in claim 29 wherein said reactivation temperature is at least about 550° C.

35. A process as set forth in claim 29 wherein increasing the temperature of the catalyst substantially throughout said combustion zone to said reactivation temperature comprises shortening the length of the flow reversal cycles.

36. A process as set forth in claim 35 wherein the temperature of said combustion zone is maintained at said reactivation temperature for a reactivation period of between about 60 and about 1500 minutes to effect removal of said sulfite and/or sulfate salts from said catalyst.

37. A process as set forth in claim 29 wherein said combustion zone comprises a fixed catalyst bed comprising a particulate catalyst having an average particle size of between about 4 mm and about 40 mm.

38. A process as set forth in claim 29 wherein said combustion zone contains a monolithic catalyst in the configuration of a honeycomb.

39. A process as set forth in claim 38 wherein said catalyst is selected from the group comprising a platinum group metal and a mixture of chromium oxide and copper oxide.

40. A process as set forth in claim 39 wherein said catalyst comprises between about 3% and about 10% by weight $Cr_2O_3$ and between about 3% and about 10% by weight CuO on an alumina support.

41. A process as set forth in claim 40 wherein said catalyst comprises between about 0.1% and about 1% by weight Pt on an alumina support.

* * * * *